(12) United States Patent
Henry et al.

(10) Patent No.: US 6,685,549 B2
(45) Date of Patent: Feb. 3, 2004

(54) METHOD AND DEVICE FOR INCREASING THE SHELF LIFE OF AN OXYGEN SENSITIVE PRODUCT

(76) Inventors: David F. Henry, 58480 Frudden Rd., Bradley, CA (US) 93426; Mark D. Henry, 2725 Stonebrook Cir., Paso Robles, CA (US) 93446

( * ) Notice: Subject to any disclaimer, the term of this patent is extended or adjusted under 35 U.S.C. 154(b) by 0 days.

(21) Appl. No.: 10/158,383

(22) Filed: May 29, 2002

(65) Prior Publication Data

US 2003/0224710 A1 Dec. 4, 2003

(51) Int. Cl.[7] .............................................. A22C 11/00
(52) U.S. Cl. ............................................................ 452/30
(58) Field of Search .............................. 452/30, 35, 36, 452/37, 38, 39, 40, 41, 42, 43, 44, 45, 46, 47, 48, 49; 99/467, 473, 477, 478; 241/47, 56

(56) References Cited

U.S. PATENT DOCUMENTS

| | | | | |
|---|---|---|---|---|
| 3,108,626 A | * | 10/1963 | Schmook et al. | 241/56 |
| 3,147,784 A | * | 9/1964 | Sloan | 241/47 |
| 3,313,332 A | * | 4/1967 | Stephan et al. | 241/98 |
| 3,580,315 A | * | 5/1971 | Schnell | 241/86 |
| 3,897,723 A | * | 8/1975 | Lucy, Jr. et al. | 99/467 |
| 3,971,187 A | * | 7/1976 | McNeill et al. | 53/434 |
| 3,992,985 A | * | 11/1976 | McFarland | 99/478 |
| 4,085,778 A | | 4/1978 | Wright | 140/93 |
| 4,085,779 A | | 4/1978 | Wells | 140/93 |
| 4,417,434 A | | 11/1983 | Piereder | 53/469 |
| 4,707,444 A | | 11/1987 | King, Jr. et al. | 435/26 |
| 4,747,342 A | * | 5/1988 | Schack et al. | 99/472 |
| 4,939,885 A | | 7/1990 | Steinke | 53/138 |
| 5,085,615 A | * | 2/1992 | Gundlach et al. | 452/198 |
| 5,281,428 A | * | 1/1994 | Morgan | 426/312 |
| 5,306,205 A | * | 4/1994 | Gilles | 452/198 |
| 5,364,251 A | * | 11/1994 | Simonsen | 418/220 |
| 5,431,939 A | * | 7/1995 | Cox et al. | 426/300 |
| 5,603,567 A | * | 2/1997 | Peacock | 366/139 |
| 5,830,050 A | | 11/1998 | Nakamura et al. | 452/31 |
| 5,871,795 A | * | 2/1999 | Roth | 426/319 |
| 5,932,265 A | * | 8/1999 | Morgan | 426/511 |
| 6,120,822 A | * | 9/2000 | Denvir et al. | 426/320 |
| 6,132,302 A | * | 10/2000 | Hiller et al. | 452/45 |
| 6,387,426 B1 | * | 5/2002 | Roth | 426/319 |
| 6,389,838 B1 | * | 5/2002 | Roth | 62/341 |
| 6,406,728 B1 | * | 6/2002 | Roth | 426/263 |
| 2003/0091708 A1 | * | 5/2003 | Garwood | 426/392 |

FOREIGN PATENT DOCUMENTS

| | | | |
|---|---|---|---|
| DE | 1532031 | * | 1/1970 |
| DE | 2746176 | * | 4/1979 |
| DE | 3446829 | * | 7/1986 |

* cited by examiner

Primary Examiner—Peter M. Poon
Assistant Examiner—David J Parsley
(74) Attorney, Agent, or Firm—Coudert Brothers LLP (57) ABSTRACT

A method and a device is provided for increasing the shelf life of an oxygen sensitive product such as ground meat by injecting an inert gas or blend of inert gases into the ground meat through a stopper as meat is being pushed toward the stuffer outlet and a conveyor to a chub packager. By introducing the inert gas at this early stage in the chub packaging operation, the oxygen content within each chub is reduced to 0.5% and less using the present invention. The inert gas forces substantially all of the ambient air away from the entire surface area of the ground meat as it is being circulated in the lower portion of the stuffer hopper and prior to being forced out through the stuffer outlet.

26 Claims, 7 Drawing Sheets

METHOD AND DEVICE FOR INCREASING THE SHELF LIFE OF AN OXYGEN SENSITIVE PRODUCT

FIELD OF INVENTION

The present invention relates to a method and device for increasing the shelf life of oxygen sensitive products such as ground beef and other meat. More particularly, the invention relates to an improved stopper for attachment to the hopper of a stuffer used in the packaging of such oxygen sensitive food products. The stopper has means for purging the ambient air surrounding the product during the stuffing operation and means for disassembling and cleaning the stopper between periods of use.

BACKGROUND OF THE INVENTION

As the global demand for processed meat increases, processors continue to demand equipment, supplies, and raw material to enhance their ability to increase productivity, profits, customer satisfaction, and most importantly sanitation measures. One high-speed packaging system for ground meat is a combination of a stuffer with a high-speed chub packaging machine. In this system, the meat, such as beef, is coarsely ground, i.e., about 9.5 mm to 19.0 mm diameter die cut, and dumped or otherwise conveyed into a hopper of the stuffer or a stuffing pump; see U.S. Pat. No. 4,417,434 and 5,830,050, respectively. The coarsely ground meat is then conveyed to the chub packaging machine; see U.S. Pat. Nos. 4,085,778; 4,085,779; and 4,939,885. An example of a commercially available high-speed chub packaging machine is a 4000 series KartridgPak chub packager. The chub packager packages the meat, with or without added an inert gas, e.g., carbon dioxide, into oxygen-impermeable casings; see U.S. Pat. No. 4,707,444.

The chubs usually range from about 4.5 kg to 9.0 kg and have a fat content ranging from about 7% to 30%. The chubs are then shipped and stored under refrigeration until needed. In the case of ground beef, they may be distributed to supermarkets that regrind the ground beef from the chubs and repackage them in Styrofoam trays, which are over wrapped with a clear plastic film for sale to the consumer. The shelf life of the repackaged product is relatively short. This is primarily due to the prolonged exposure of the meat product to the residual oxygen present in the entire packaging system. It is well known that the prolonged exposure of the meat product to oxygen also bacterial decay and discoloration of the meat.

It is known to use a modified atmosphere environment whereby a preservation-enhancing gas mixture, typically containing a bacterial inhibitor such as carbon dioxide, is introduced into the casing during the chub packaging operation. This method has led to increases in the maximum shelf life of the product of about twenty days.

It would be desirable to be able extend the shelf life of the packaged meat within chubs beyond the present maximum shelf life of about twenty days, and preferably, up to a maximum shelf life of sixty or even ninety days.

One type of commercially available stuffer, e.g., Henry & Sons' AC-20 Continuous Vacuum Stuffer; set Appendix I taken from a web site of Henry & Sons for specifications and other details, which information is incorporated herein by reference. The stuffer comprises a funnel-shaped hopper, a scraper for keeping the ground meat from sticking to the inside of the hopper and a stopper attached to the top of the hopper. The scraper is attached to a ring gear connected to a drive mechanism. The ring gear is located in the bottom of the hopper adjacent the outlet and has either a right or a left spiral. The ring gear causes the scraper to rotate usually in a counterclockwise direction. The combination of the scraper and ring gear forces the ground meat in a downward spiral manner toward the hopper outlet and the mechanism that feeds the ground meat to the chub packaging machine. In the commercially available continuous vacuum stuffers, the hopper, ring gear, and stopper are stainless steel and the scraper is an industrial plastic, such as nylon.

The stopper is usually constructed of hollow tubing, closed at each end, and protrudes down into the bottom of the hopper adjacent, but not touching, the ring gear. The stopper stops, or at less slows down, the meat from continuing to spin or rotate around the lower portion of the hopper and allows the scrapper and ring rear combination to function more efficiently to force the meat out through the stuffer outlet and into the conveyer to the chub packager. A commercially available stopper consists of a straight rod extending along the longitudinal axis of the hopper and has extensions, called a paddle, attached to the lower end of the rod that is angled at least 15 degrees from vertical. The stopper also includes attachment means for fixedly attaching the stopper to the hopper.

SUMMARY OF THE INVENTION

The device and method of the present invention dramatically increases the shelf life of oxygen sensitive food products by introducing an inert gas during the stuffing stage of the packaging process.

The present invention comprises an improvement in the stuffer in which the stopper has means for injecting an inert gas or blend of inert gases into the food product as it is being pushed toward the stuffer outlet. By introducing the inert gas at this early stage in the chub packaging operation, the oxygen content within each chub is reduced from about 7% using the prior art method to 0.5% and less using the present invention. Without being bound by the theory of the mechanism, it is believed that inert gas forces substantially all of the ambient air away from the entire surface area of the product as it is being circulated in the lower portion of the stuffer hopper and prior to being forced out through the stuffer outlet.

Preferably, the inert gas or blend of gases is heavier than air. Therefore, the inert gas injected from the stopper displaces the ambient air surrounding the meat entering the hopper and purges the air away from the meat. The remaining oxygen present in the stuffer outlet and conveyor to the chub packager has been found to be dramatically reduced from the current operation of adding an inert gas down flow from the stuffer.

As discussed in further detail in the Examples section below, measurements of the oxygen content in the chubs leaving the packaging machine has been found to be in the range of about 0.2 to 0.5 volume % oxygen using the device of the present invention. The resulting shelf life of the ground meat has been found to increase to about 90 days using the apparatus and method of the present invention.

In contrast, introducing an inert gas into the casing as the chubs are being formed in the chub packager results in reducing the ambient oxygen level from 21% to only about 7-volume %. The resulting shelf life of the ground meat has been found to be about 21 days using the apparatus and method of the prior art.

Various means can be used injecting or otherwise introducing the inert gas during the stuffing operation. One injection means is to place a mesh screen in the hollow stopper connected to a source of inert gas where the mesh size of the screen is designed to avoid becoming plugged with the product. Another injection means is to place the plurality of orifices along the lower section of the stopper connected to the inert gas source. Preferably, nozzles are placed in the orifices to avoid clogging them with product. Another injection means is to place either the orifices or the nozzles in the paddle adjacent to the lower end of the stopper.

A still further injection means is to construct the hollow stopper connected to an inert gas supply in at least two sections; (1) the upper section connects to the support at the top of the hopper; and (2) the bottom section having the plurality of holes. A suitable coupling joins the two sections. The coupling permits the lower section to be easily detached from the upper section for cleaning and sanitation procedures. A further modification of this injection means is to add a vertical section that is coupled to the upper section and fixedly attach to the bottom section that includes a paddle.

BRIEF DESCRIPTION OF THE DRAWINGS

Further features and advantages will become apparent from the following and more particular description of the preferred embodiments of the invention, as illustrated in the accompanying drawings in which.

DETAILED DESCRIPTION OF THE INVENTION

Figure 1:
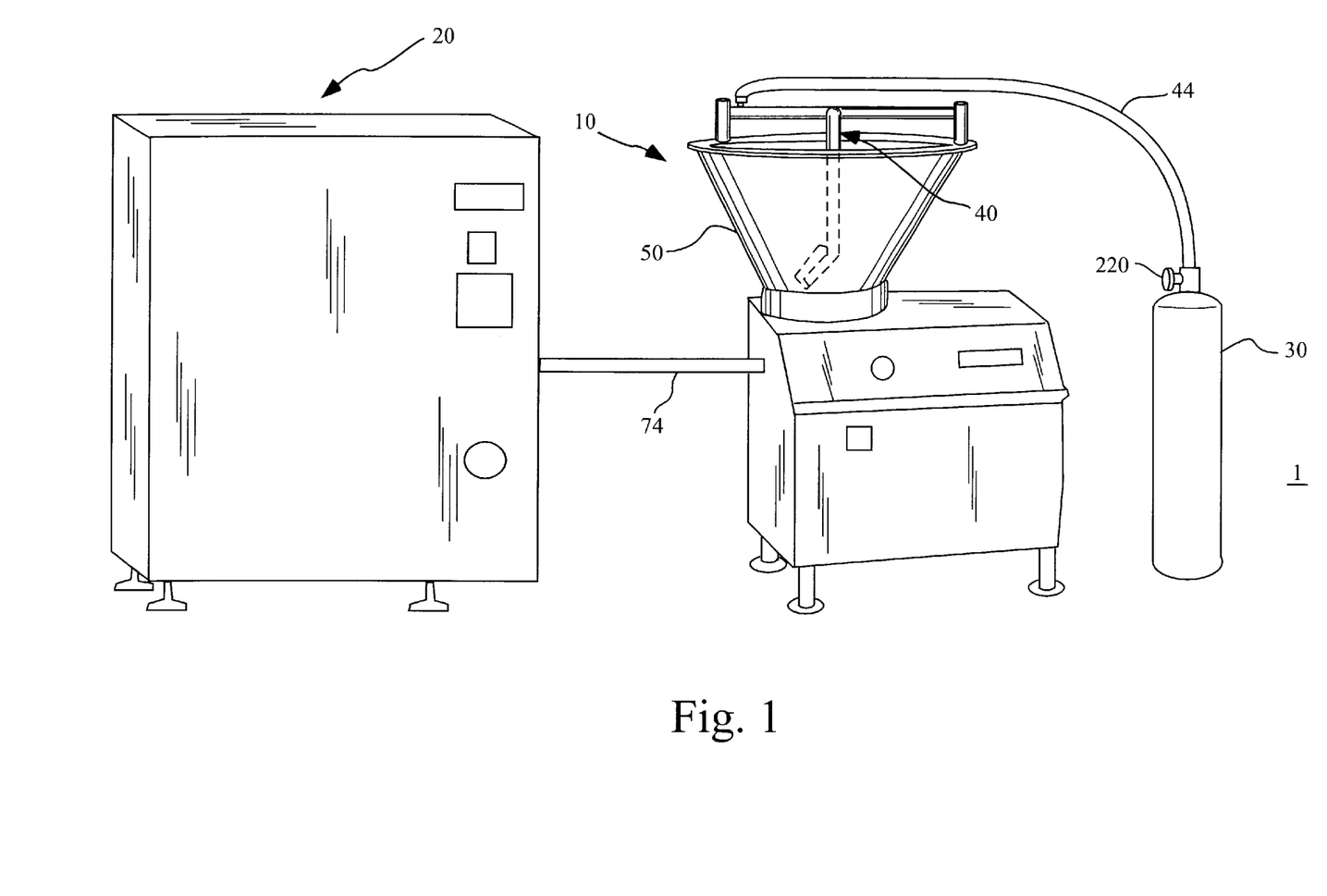
FIG. 1 is a top and side perspective view of an apparatus of the present invention in line with a chub packager and show a stuffer having a hopper and a stopper in fluid communication with a gas cylinder.
Figure 2:
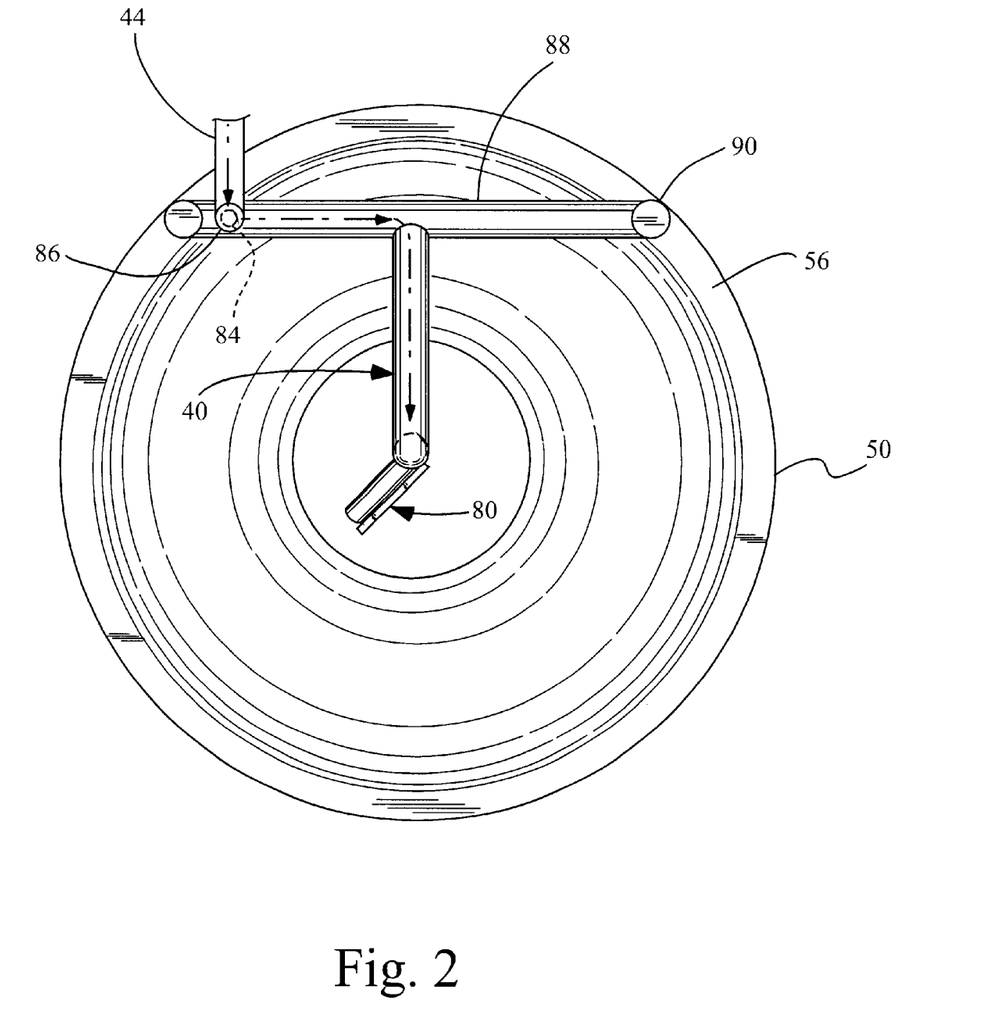
FIG. 2 is a top view of the hopper shown in FIG. 1.
Figure 3:
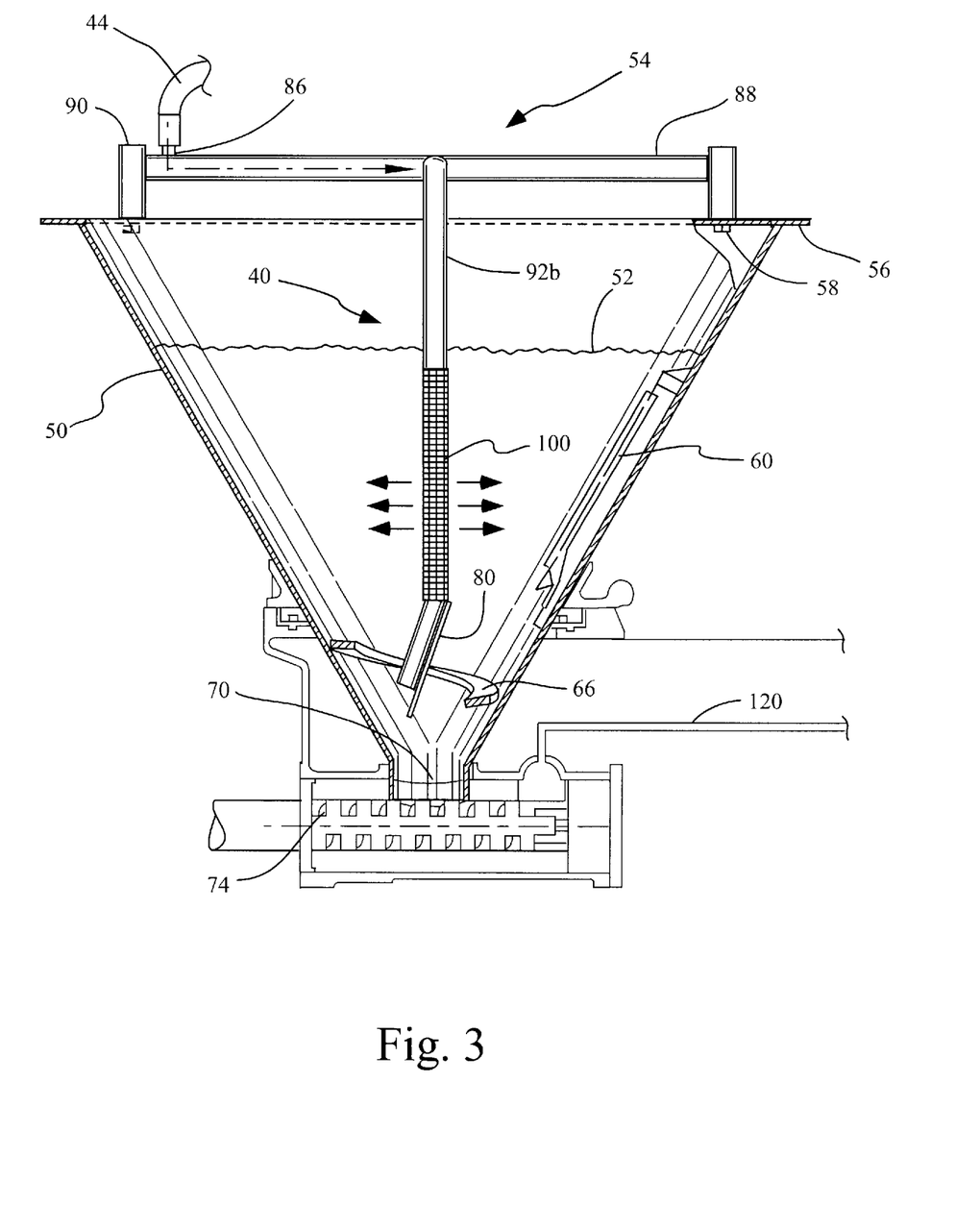
FIG. 3 is a partial sectional side view of the hopper shown in FIG. 1 that has been enlarged to show one embodiment of the present invention.

Referring now to FIGS. 1–3, packaging system 1 includes improved stuffer 10 upstream of chub packager 20 and cylinder 30 containing an inert gas or a blend of inert gases in fluid communication with stopper 40. The inert gas is fed via gas inlet line 44 to funnel shaped hopper 50, designed to move ground meat in a downward motion, and is injected into the ground meat in stuffer 10 through stopper 40. Preferably hopper 50 is at least ¾$^{th}$ full of product and is always maintained at or above product level 52 shown in FIG. 1.

Stopper 40 is mounted to attachment means or support 54 attached to rim 56 of hopper 50 by means of bolts 58, welding or other similar means, so that stopper 40 is in a stationary position along the longitudinal axis through the center of hopper 50.

In FIG. 3, the internals of hopper 50, in which scrapper 60 and ring gear 66 are operably mounted within hopper 50 for movement in a counterclockwise rotation to screw the ground meat toward hopper outlet 70 and screw conveyor 74.

A suitable hopper, scraper, Part #114-080-001 (A-46a), and stainless steel ring gear, Part #114-051-000 (A-32), are designed for the Continuous Vacuum Stuffer A20 discussed under the Background of the Invention section, and are commercially available from Henry & Sons; see Appendix II taken from a web site of Henry & Sons for additional details, the details of which are incorporated herein by reference.

Stopper 40 having paddle 80 is mounted within hopper 50 to prevent the ground meat from continuing to rotate in a counterclockwise manner within hopper 50 and to direct the product into outlet 70.

In the embodiment shown in FIGS. 1–4, gas inlet line 44 may be connected to stopper 40 in the following manner. For example, ⅜ inch polymeric tubing 44 is connected to quick connect fitting 84 inserted in ½ inch NPT (National Pipe Thread) nipple 86 treaded into a hole drilled into 1⅝ inch stainless steel tubing 88 adjacent to one of connections 90 bolted to rim 56 with bolts 58. Support 54 consists of tubing 88 welded at each end to tee connections 90. For example stopper 40 is 1½ inch stainless steel tubing and is welded at right angles in the middle of tubing 88. Stopper 40 in this embodiment is basically in the form of a right angle elbow with horizontal section 92a extending a foot from its connection to tubing 88 to the center of hopper 60 and vertical section 92b extending along the longitudinal axis of hopper 50.

Figure 4:
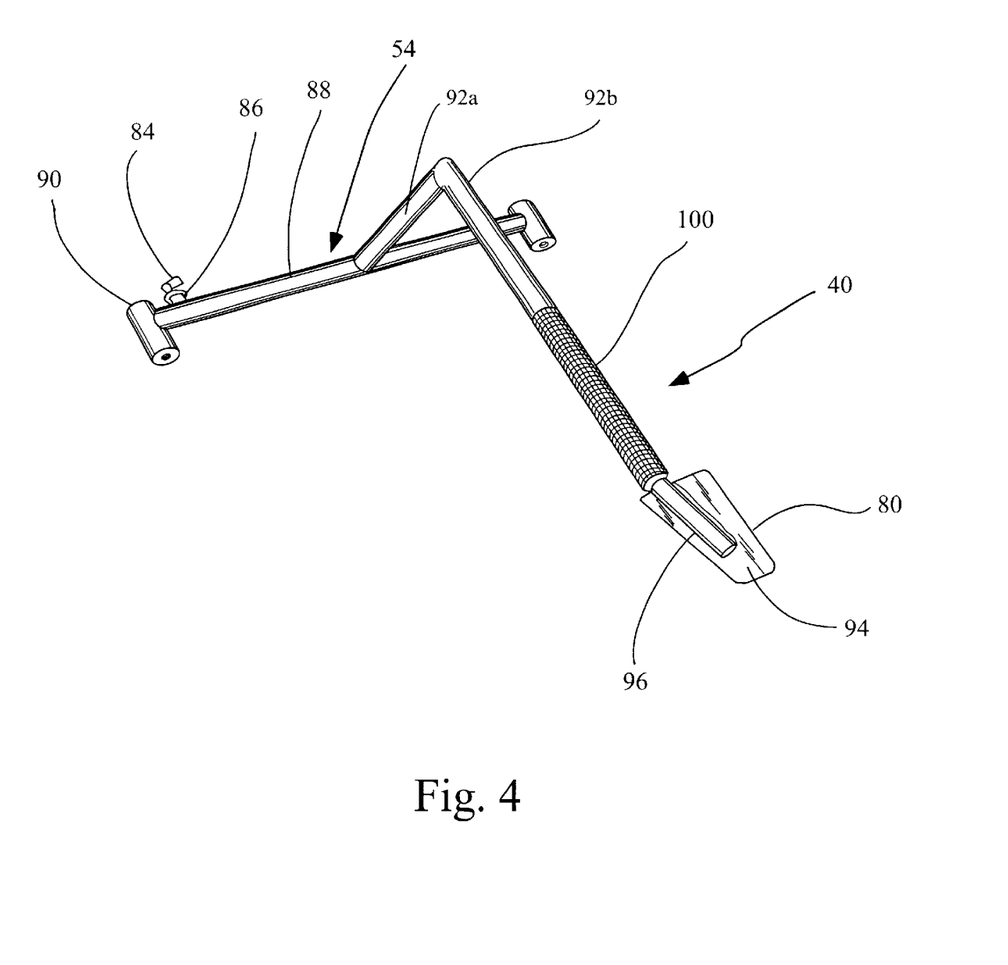
FIG. 4 is a front and side prospective view of the support and flat stopper combination shown in FIG. 3.

In the embodiment shown in FIGS. 3–4, paddle 80 includes flat piece 94 of stainless steel, i.e., approximately 2–4 inches by 6–8 inches, welded to rod 96 that is in turn is welded to end of vertical section 92b. Paddle 80 is at an angle of about 15 to 20 degrees off the longitudinal axis of stopper 40.

A section is removed from vertical section 92b where it connects to paddle 80 and screen 100 is welded in its place. In this specific embodiment, screen 100 is a tubular section approximately one foot in length. The tubular section is formed by rolling a multi-mesh screen that is commercially available from MAP Systems, Inc. into a 1⅝ inch tube to match the diameter of stopper 40. Screen 100 is designed so that the product in hopper does not interfere with the passage of the gas. It is apparent that a number of other types of screens be used to serve this purpose. Various other means for injecting an inert gas into the hopper are described below.

Vacuum line 120 is operably connected to a means for generating a vacuum in conveyor 74 to packager 20. Although stuffer 10 is designed to operate under vacuum, the device of the present invention is not limited to vacuum stuffing operations.

Figure 5:
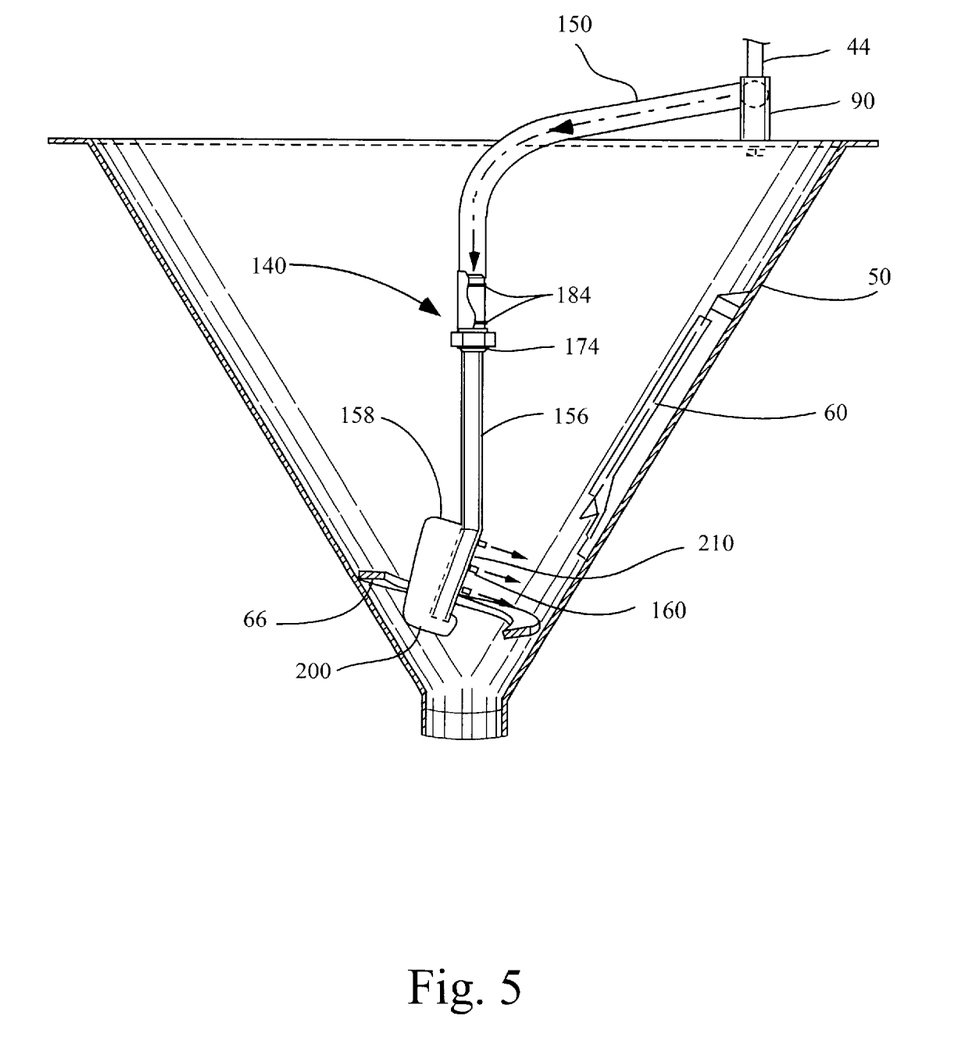
FIG. 5 is a partial sectional side view of the hopper to show a preferred embodiment of the present invention.
Figures 6, 7:
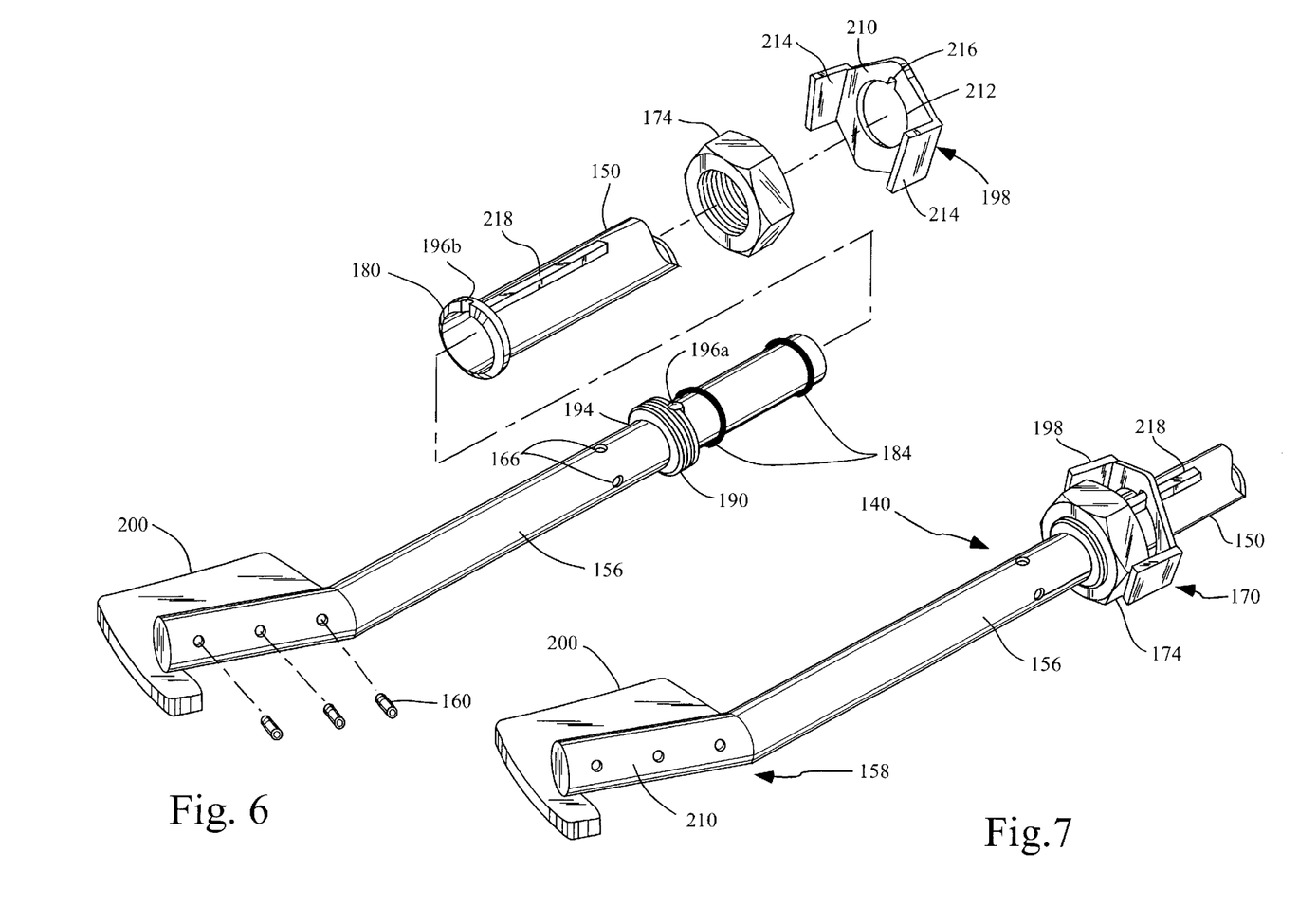
FIG. 6 is top and side perspective view of a modification of the preferred embodiment of the present invention as it is being assembled.
FIG. 7 is a perspective top and side view of the assembled stopper of FIG. 6 with a nut lock being slid into place.

In FIGS. 5–7 a preferred embodiment of stopper of the present invention is shown in which flat stopper 140 consists of upper section 150, vertical section 156, and paddle section 158 having a plurality of nozzles 160 screwed into holes 166 drilled into the sides of paddle section 158 or vertical section 156 or both sections as shown. Upper section 150 forms a smooth arc from its connection to tubing 88 of support 54 (shown in FIG. 4) to vertical section 156.

Sanitary connection locking mechanism 170 consists of nut 174 that encircles upper section 150 against collar 180, two O-rings 184 for sealing nut 174 to threaded section 190 welded or otherwise fixedly attached to end 194 of lower section 156.

In the embodiment shown in FIG. 6, alignment pin 196a is built into threaded section 190 and alignment notch 196b is built into collar 180 adjacent the lower end of upper section 150 for aligning vertical and upper sections. In addition, locking mechanism 170 includes nut lock 198 to prevent accidental uncoupling of sealing nut 174 that could result in as number of apparent consequences.

Flat paddle 200 is welded to rod 210 attached to the end of vertical section 156. In FIG. 5 nozzles 160 are only shown in paddle 200, whereas in FIGS. 6 and 7, nozzles are inserted along vertical section 156 and in paddle section 158. Although the device of the present invention is operable for periods of time using only orifices 160, the product would tend to plug orifices 160 and require frequent shutdowns for cleaning.

Nut lock 198 in this embodiment is constructed of 1 inch hexagonal plate 210 that has 1½" hole 212 in the center and 2 tabs 214 welded 180° from each other. Hexagonal plate 210 has a ¼" notch machined as shown in FIG. 6 to accept ¼ inch locking strip 218 that is welded to 1½ inch upper section 150. Hexagonal plate 210 is shown in FIG. 7 sliding down locking strip 218 by gravity to encapsulate nut 174 and to lock it in place.

The method of operating the device of the present invention shown in FIGS. 1–4 is as follows: As the product is dumped into hopper 50 from meat carts or on a conveyor, valve 220 is opened on cylinder 30 containing an inert gas under pressure. The inert gas comprises carbon dioxide, or a blend of inert gases, preferably containing sufficient carbon dioxide. For example, a blend of 50 vol. % carbon dioxide and 50 vol. % nitrogen can be used. The gas is pressurized though inlet gas line 44, quick connect 84, nipple 86 and tubing 88, to stopper 40 from which the gas exits through the plurality of nozzles 160 (shown in FIG. 6) into the product being rotated in the bottom of hopper 50. The rate of product from stuffer 10 is in the range of about 100 to about 1000 pounds of product per hour. The desired ratio of inert gas to the weight of product from stuffer is about 0.05 to about 0.2 cubic feet per pound of product.

Figure 8:
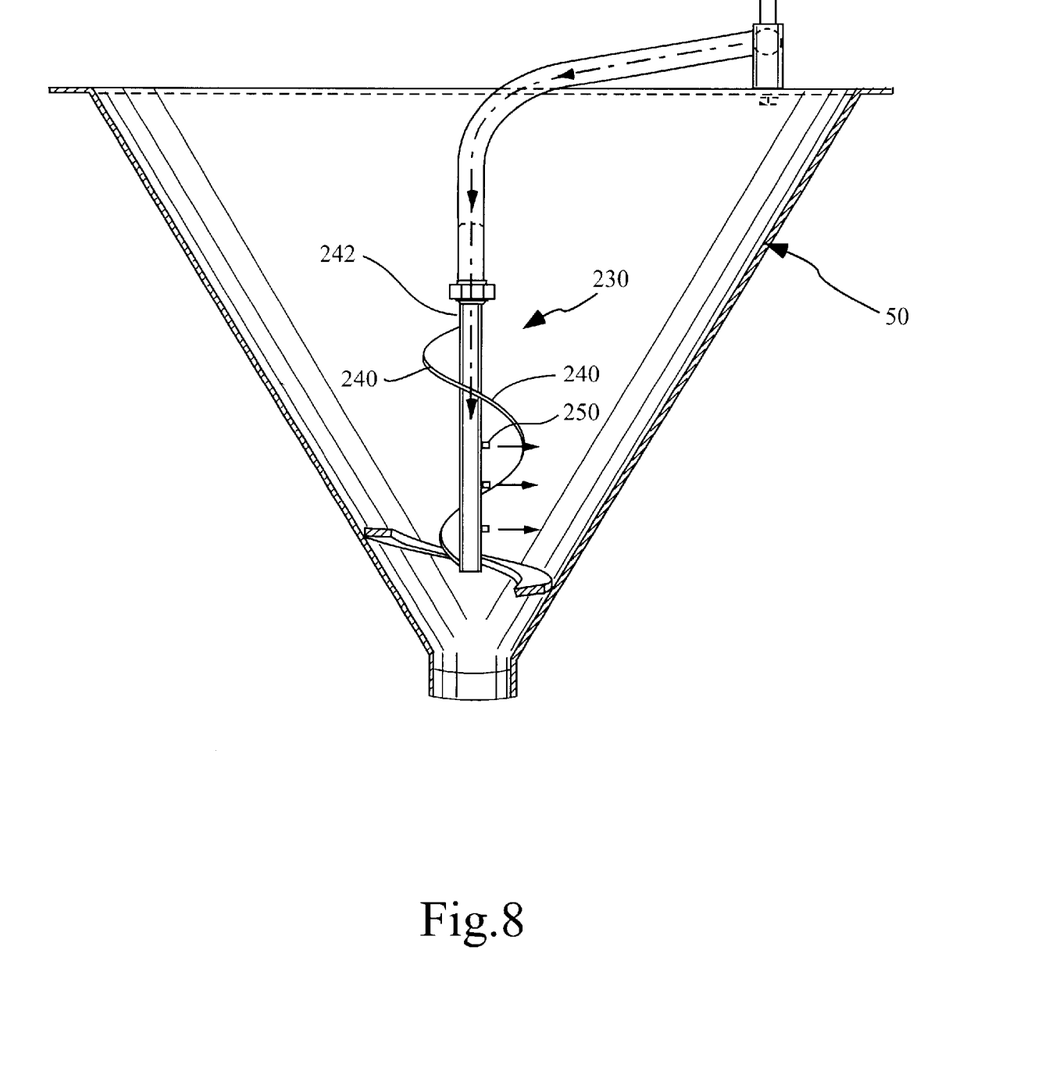
FIG. 8 is a partial sectional side view of the hopper to show another modification of the preferred embodiment of the present invention.

Typically the product is ground meat that enters hopper 50 is at a temperature slightly below freezing. At these temperatures, it is preferred that the stopper is spiral stopper 230 having helical or spiral paddle 240 attached to its sides in place of flat paddles 80 or 158 as discussed above. FIG. 8 shows spiral stopper 230 in which spiral paddle 240 consisting of stainless steel in the shape of spiral is attached to the sides of hollow vertical tube 242. A number of holes are drilled along vertical section 242 and nozzles 250 are mounted within the holes as shown in FIG. 8.

The comparative example and example of the preferred embodiment of the present invention that follows illustrates the unexpected results from practicing the apparatus of the present invention over that of the prior art. The examples are for illustrative purposes only and are not meant to limit the scope of the claims in any way.

EXAMPLE

Comparative Example

A Henry & Sons' AC-20 Continuous Vacuum Stuffer was placed in line with a KartridgPak 4000 packaging machine substantially as shown in FIG. 1, but without the modification of the inert gas being injected into the stuffer as described above. In this comparative example, ground beef was dumped into the hopper and fed to chub packager 20 at a rate of about 400 pounds per hour. The hopper w as maintained from about 75% to 100% full of product at all times during the operation. Carbon dioxide under a pressure of about 20 psig was pressurized at a rate of 30 to 60 cu. ft./hr. into the rope sections of the filled tubular casing prior applying the clips to from the chubs in the packaging machine. The oxygen levels in the exterior voids of the chubs leaving the packaging machine were measured with an oxygen meter and found to be 7 vol. % oxygen.

Example

The comparative example was repeated using the embodiment of the present invention described in the Detailed Description section above in connection with FIGS. 1–4e. In this example illustrating the present invention, ground beef was dumped into the hopper and fed to chub packager 20 to maintain the same product level in the hopper and at the same rate as in the comparative example. Carbon dioxide was injected at the same rate used in the comparative example into the product in the lower section of hopper 50 as discussed in detail above. The oxygen levels in the exterior voids of the chubs leaving the packaging machine were measured with the same oxygen meter and found to be in the range from 0.27 to 0.5 vol. % oxygen, over an order of magnitude less than that of the comparative example. This low level of oxygen was found to increase the shelf life of the resulting chubs from 21 days to 90 days.

Without departing from the spirit and scope of this invention, one of ordinary skill in the art can make various changes and modifications to the device of the present invention to adapt it to various usages and conditions. As such, these changes and modifications are properly, equitably, and intended to be, within the full range of equivalents of the following claims.

What is claimed is:

1. A continuous vacuum stuffer comprising:
   a) a funnel-shaped hopper having an open top and a bottom outlet for directing an oxygen sensitive food product downward;
   b) a rotatable scraper inside the hopper for preventing the product from sticking to the sides of the hopper and for feeding the product in a downward manner towards said bottom outlet;
   c) means attached to said scraper for rotating said scraper;
   d) a drive mechanism adjacent the bottom outlet of said hopper for continuously feeding the product to a chub packaging machine;
   e) vacuum means connected to said drive mechanism for drawing a vacuum within said drive mechanism; and
   f) a stopper for at least slowing down the product from continuously rotating in the lower portion of said hopper and for injecting an inert gas into the product, said stopper having:
      i) an attachment means for attaching said stopper to the open top of said hopper; and
      ii) a hollow tube extending from said attachment means to adjacent the bottom outlet, said hollow tube having an upper section with an upper end in fluid communication with an inert gas source and a lower section having a plurality of orifices for injecting the inert gas from the inert gas source into the product prior to said drive mechanism feeding the product to the chub packaging machine.

2. The device of claim 1, wherein said hollow tube is detachable into two sections.

3. The device of claim 2, wherein said hollow tube has an upper section having an upper end connected to a source of inert gas and a lower section having a nozzle engaged in each of said plurality of orifices.

4. The device of claim 3, wherein said upper section is connected to said lower section with a coupling means to readily detach the lower section for cleaning.

5. The device of claim 4, wherein said coupling means comprises a threaded section mounted to the lower section, a nut threadably engagable with said threaded section encircling said upper section, and a collar at the lower end of said upper section to stop said nut.

6. The device of claim 5, wherein said threaded section contains an alignment pin built into said threaded section mounted to the lower section and an alignment notch built into said collar adjacent the lower end of said upper section for aligning the lower and upper sections.

7. The device of claim 6, wherein said coupling means comprises a locking means to prevent decoupling during operation of said stopper.

8. The device of claim 1, wherein said stopper comprises a said hollow tube in fluid communication with a source of inert gas having a screen for injecting the inert gas into the lower portion of said hopper.

9. The device of claim 1, wherein a paddle is fixedly attached to the end of said hollow tube.

10. The device of claim 9, wherein said paddle consists of a rod attached to the end of said hollow tube and a flat plate fixedly attached to said rod.

11. The device of claim 9, wherein said paddle consists of a flat plate fixedly attached to said hollow tube having a plurality of orifices therein.

12. The device of claim 1, wherein a spiral paddle is fixedly attached to said tube.

13. The device of claim 1, wherein the inert gas is carbon dioxide.

14. The device of claim 1, wherein the inert gas is a blend of carbon dioxide and another inert gas selected from the group consisting of nitrogen, helium, xenon, and mixtures thereof and has a molecular weight of greater than 30.

15. The device of claim 1, wherein ratio of the inert gas injected into the hopper to the weight of product from the bottom outlet is about 0.05 to about 0.2 cubic feet of inert gas to pounds of product.

16. A stopper attachable to a funnel-shaped hopper having an open top and a bottom outlet of a continuous vacuum stuffer used in the packaging of an oxygen sensitive product, said stuffer having a rotatable scraper inside the hopper for at least slowing down the product from sticking to the sides of the hopper and for feeding the product in a downward manner towards said bottom outlet, means attached to said scraper for rotating said scraper, a drive mechanism adjacent the bottom outlet of said hopper for continuously feeding the product to a chub packaging machine, vacuum means connected to said drive mechanism for drawing a vacuum within said drive mechanism, said stopper comprising an attachment means for attaching said stopper to the open top of said hopper, a hollow tube extending from said attachment means to adjacent the bottom outlet, in fluid communication with a source of inert gas, said hollow tube being detachable into an upper and lower sections, said upper section having an upper end connected to the source of inert gas and said lower section having a plurality of orifices for injecting the inert gas from the source of inert gas into the product prior to said drive mechanism feeding the product to the chub packaging machine, and a coupling means for attaching the lower section to the upper section having a threaded section mounted to said lower section, a nut threadably engagable with said threaded section and encircling said upper section, and a collar at the lower end of said upper section to stop said nut.

17. The device of claim 16, wherein said lower section has a nozzle engaged in each of said plurality of orifices.

18. The device of claim 16, wherein said injection means comprises a screen attached within said hollow tube.

19. The device of claim 16, wherein a paddle is fixedly attached to the end of said hollow tube.

20. The device of claim 19, wherein said paddle consists of a rod attached to the end of said hollow tube and a flat plate fixedly attached to said rod.

21. The device of claim 19, wherein said paddle consists of a flat plate fixedly attached to a said hollow tube having a plurality of orifices therein.

22. The device of claim 16, wherein a spiral paddle is fixedly attached to said tube.

23. The stopper of claim 16, wherein said attachment means comprises a pair of connections mounted to said hopper and tubing attached to said connections and in fluid communication with said source of inert gas and said stopper.

24. The stopper of claim 23, wherein a gas inlet is connected to said tubing and said hollow tube of said stopper is attached to said tubing.

25. The device of claim 16, wherein said threaded section contains an alignment pin built into said threaded section mounted to the lower section and an alignment notch built into said collar adjacent the lower end of said upper section for aligning the lower and upper sections.

26. The device of claim 25, wherein said coupling means also has a nut locking means to prevent decoupling during operation of said stopper.

* * * * *